US012678767B2

(12) United States Patent　(10) Patent No.:　US 12,678,767 B2
Matsumoto et al.　(45) Date of Patent:　Jul. 14, 2026

(54) COATING SOLUTION

(71) Applicant: NITTETSU MINING CO., LTD., Tokyo (JP)

(72) Inventors: Hiromichi Matsumoto, Tokyo (JP); Shinichi Ogura, Tochigi (JP); Ken Shinoda, Tochigi (JP); Toru Hosi, Tokyo (JP)

(73) Assignee: NITTETSU MINING CO., LTD., Tokyo (JP)

( * ) Notice: Subject to any disclaimer, the term of this patent is extended or adjusted under 35 U.S.C. 154(b) by 559 days.

(21) Appl. No.: 17/294,133

(22) PCT Filed: Nov. 11, 2019

(86) PCT No.: PCT/JP2019/044044
§ 371 (c)(1),
(2) Date: May 14, 2021

(87) PCT Pub. No.: WO2020/100780
PCT Pub. Date: May 22, 2020

(65) Prior Publication Data
US 2022/0001354 A1　Jan. 6, 2022

(30) Foreign Application Priority Data

Nov. 16, 2018　(JP) ................................ 2018-215988
Aug. 22, 2019　(JP) ................................ 2019-151690
Sep. 30, 2019　(JP) ................................ 2019-179795

(51) Int. Cl.
B01J 20/22　(2006.01)
B01D 39/16　(2006.01)
(Continued)

(52) U.S. Cl.
CPC .......... B01J 20/22 (2013.01); B01D 39/1653 (2013.01); B01D 39/2072 (2013.01);
(Continued)

(58) Field of Classification Search
CPC .... B01J 20/22; B01J 20/103; B01J 20/28004; B01J 20/28019; B01J 20/3042;
(Continued)

(56) References Cited

U.S. PATENT DOCUMENTS 7,988,991 B2 *　8/2011　Tateishi ............... A61K 9/7053
424/448
10,100,204 B2　10/2018　Huang et al.
(Continued)

FOREIGN PATENT DOCUMENTS

CL　201700154 A1　8/2017
CN　105 112 894 A　12/2015
(Continued)

OTHER PUBLICATIONS

Zhang et al. "One-pot synthesis of biodegradable polydopamine-doped mesoporous silica nanocomposites (PMSNs) as pH-sensitive targeting drug nanocarriers for synergistic chemo-photothermal therapy" (https://pubs.rsc.org/en/content/articlehtml/2018/ra/c8ra07467d) RSC Adv., 2018, 8, pp. 37433-37440. (Year: 2018).*
(Continued)

*Primary Examiner* — Angela C Brown-Pettigrew
*Assistant Examiner* — Preeti Kumar
(74) *Attorney, Agent, or Firm* — Greenblum & Bernstein, P.L.C.

(57) ABSTRACT

Provided is a coating solution for forming a dust collecting layer, wherein the coating solution can be applied uniformly, and the formed dust collecting layer does not easily peel off from a filter element material, and allows to collect fine powder products having a small particle size. The coating solution is for forming a dust collecting layer in a dust collecting filter, and contains a fine powder, dopamine hydrochloride, and an adhesive.

4 Claims, 5 Drawing Sheets

| EXAMPLE | COATING POWDER | APPEARANCE | SURFACE | | SURFACE ROUGHNESS Sa | STRENGTH |
|---|---|---|---|---|---|---|
| | | | 50 | 200 | μm | POOR TO VERY GOOD |
| EXAMPLE 5 | SPHERICAL SILICA | | | | 8.05 | POOR |
| EXAMPLE 6 | SPHERICAL SILICA | | | | 3.77 | VERY GOOD |
| EXAMPLE 7 | SPHERICAL SILICA | | | | 6.47 | GOOD |
| EXAMPLE 8 | ALUMINA | | | | 10.99 | GOOD |
| EXAMPLE 9 | HEMATITE | | | | 5.59 | GOOD |

(51) Int. Cl.
  *B01D 39/20* (2006.01)
  *B01J 20/10* (2006.01)
  *B01J 20/28* (2006.01)
  *B01J 20/30* (2006.01)

(52) U.S. Cl.
  CPC ....... *B01J 20/103* (2013.01); *B01J 20/28004* (2013.01); *B01J 20/28019* (2013.01); *B01J 20/3042* (2013.01); *B01D 2239/1241* (2013.01)

(58) Field of Classification Search
  CPC ........... B01D 39/1653; B01D 39/2072; B01D 2239/1241; B01D 39/1661; B01D 2239/0407; B01D 2239/0478; B01D 2239/086; C09D 7/61; C09D 7/63; C09D 201/00
  See application file for complete search history.

(56) References Cited

U.S. PATENT DOCUMENTS

| | | | |
|---|---|---|---|
| 11,250,986 B2 * | 2/2022 | Hwang | H01B 3/307 |
| 2006/0086655 A1 | 4/2006 | Agawa et al. | |
| 2006/0088708 A1 | 4/2006 | Nakanishi et al. | |
| 2006/0207932 A1 | 9/2006 | Hajek et al. | |
| 2009/0097313 A1 | 4/2009 | Park et al. | |
| 2010/0093569 A1 * | 4/2010 | Egami | C10M 123/04 |
| | | | 508/136 |
| 2010/0282100 A1 * | 11/2010 | Okuda | C09D 11/50 |
| | | | 442/59 |
| 2015/0140438 A1 | 5/2015 | Sun et al. | |
| 2017/0130058 A1 | 5/2017 | Huang et al. | |
| 2022/0001354 A1 | 1/2022 | Matsumoto | |

FOREIGN PATENT DOCUMENTS

| | | |
|---|---|---|
| CN | 107033746 A | 8/2017 |
| CN | 105419627 B | 10/2017 |
| DE | 102005012659 A1 | 9/2006 |
| EP | 0 393 374 A2 | 10/1990 |
| EP | 3881921 | 10/2024 |
| JP | 2003-126627 | 5/2003 |
| JP | 2004-202326 | 7/2004 |
| JP | 2008-535649 | 9/2008 |
| JP | 2008-272692 | 11/2008 |
| JP | 2015-520109 | 7/2015 |
| WO | 98/30315 A1 | 7/1998 |
| WO | WO-2014118382 A1 * | 8/2014 | A61L 27/34 |
| WO | WO-2017204562 A1 * | 11/2017 | C08K 3/40 |
| WO | WO2020100780 A1 | 10/2024 |

OTHER PUBLICATIONS

Dopamine Modification of Interfaces between polymers and metals https://pure.tue.nl/ws/files/3649063/735527.pdf, pp. 1-137. (Year: 2012).*

EESR issued in EP Patent Application No. 19884342.7, Jun. 29, 2022.

Office Action issued in ID Patent Application No. P00202103122, Oct. 14, 2022, translation.

Office Action issued in JP Patent Application No. 2019-151690, Sep. 6, 2023, translation.

Office Action issued in JP Patent Application No. 2019-179795, Sep. 6, 2023, translation.

Office Action issued in VN Patent Application No. 1-2021-03455, Oct. 30, 2023, translation.

Office Action issued in CN Patent Application No. 201980089013.1, May 10, 2022, translation.

"Technical Report No. 20 "EA-Eco Toner"", Fuji Xerox Co., Ltd., 2011, Abstract, downloaded from: https://www.fujifilm.com/fb/company/technical/tr/2011/pdf/s_2.pdf.

ISR issued in WIPO Patent Application No. PCT/JP2019/044044, Feb. 4, 2020, English translation.

IPRP issued in WIPO Patent Application No. PCT/JP2019/044044, May 18, 2021, English translation.

Office Action issued in TW Patent Application No. 108141581, Jun. 16, 2023, translation.

Office Action issued in Indian Patent Application No. 202117026526, Sep. 19, 2022.

INAPI Office Action issued in CL Patent Application No. 202101216, May 30, 2022, partial English translation.

Office Action issued Mar. 10, 2025 in Korean patent application No. 10-2021-7018267, with English machine translation thereof.

Kim et al., "Gas Transport Behavior of Polydopamine-Coated Composite Membranes," *Membrane Journal*, vol. 23, No. 2, Apr. 2013, pp. 135-143, English abstract.

Office Action issued Oct. 3, 2024 in Canadian patent application No. 3,118,549.

* cited by examiner

Figure 1

| | PEELING | FIRST | SECOND | THIRD |
|---|---|---|---|---|
| PTFE | BEFORE | | | |
| | AFTER | | | |
| JIS CATEGORY | | 5 | | |
| PDA + PTFE | BEFORE | | | |
| | AFTER | | | |
| JIS CATEGORY | | 4 | | |
| SILICA | BEFORE | | | |
| | AFTER | | | |
| | | 4 | | |
| PDA + SILICA | BEFORE | | | |
| | AFTER | | | |
| JIS CATEGORY | | 2 | | |

Figure 5

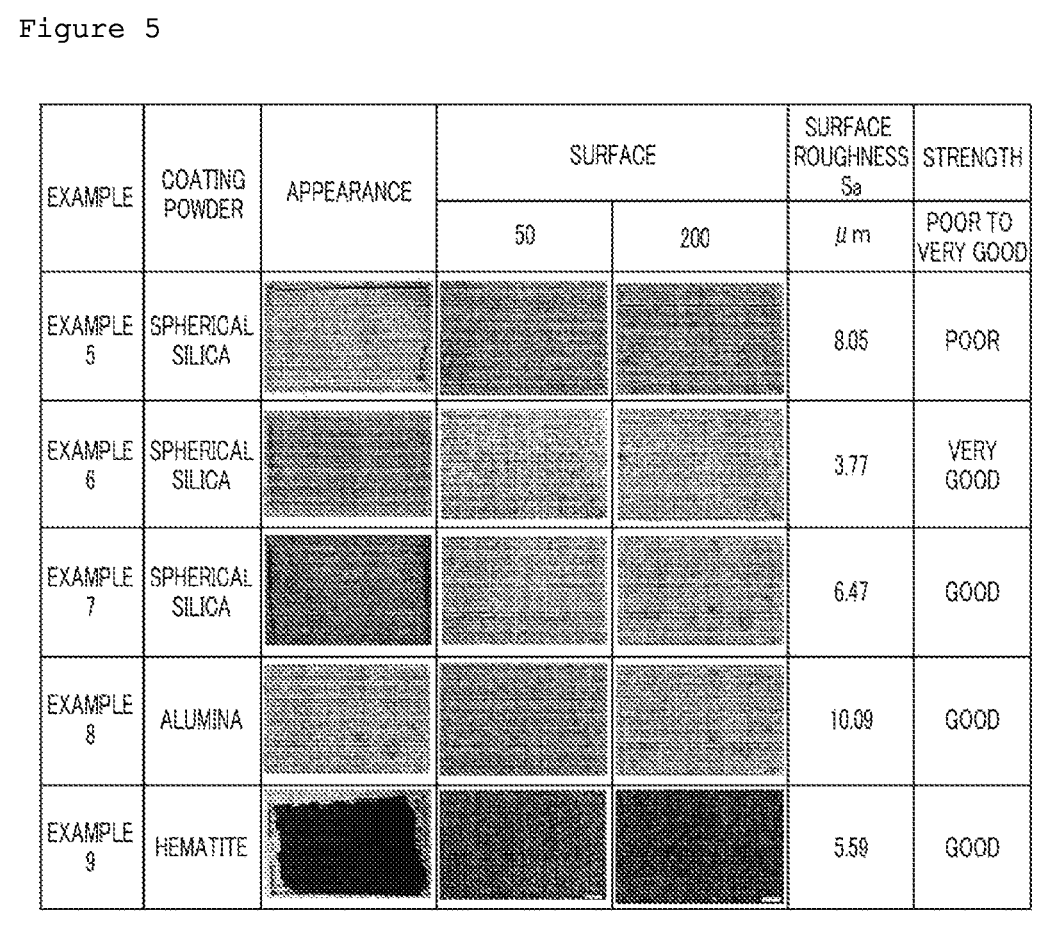

| EXAMPLE | COATING POWDER | APPEARANCE | SURFACE | | SURFACE ROUGHNESS Sa | STRENGTH |
|---|---|---|---|---|---|---|
| | | | 50 | 200 | $\mu$m | POOR TO VERY GOOD |
| EXAMPLE 5 | SPHERICAL SILICA | | | | 8.05 | POOR |
| EXAMPLE 6 | SPHERICAL SILICA | | | | 3.77 | VERY GOOD |
| EXAMPLE 7 | SPHERICAL SILICA | | | | 6.47 | GOOD |
| EXAMPLE 8 | ALUMINA | | | | 10.09 | GOOD |
| EXAMPLE 9 | HEMATITE | | | | 5.59 | GOOD |

Figure 6

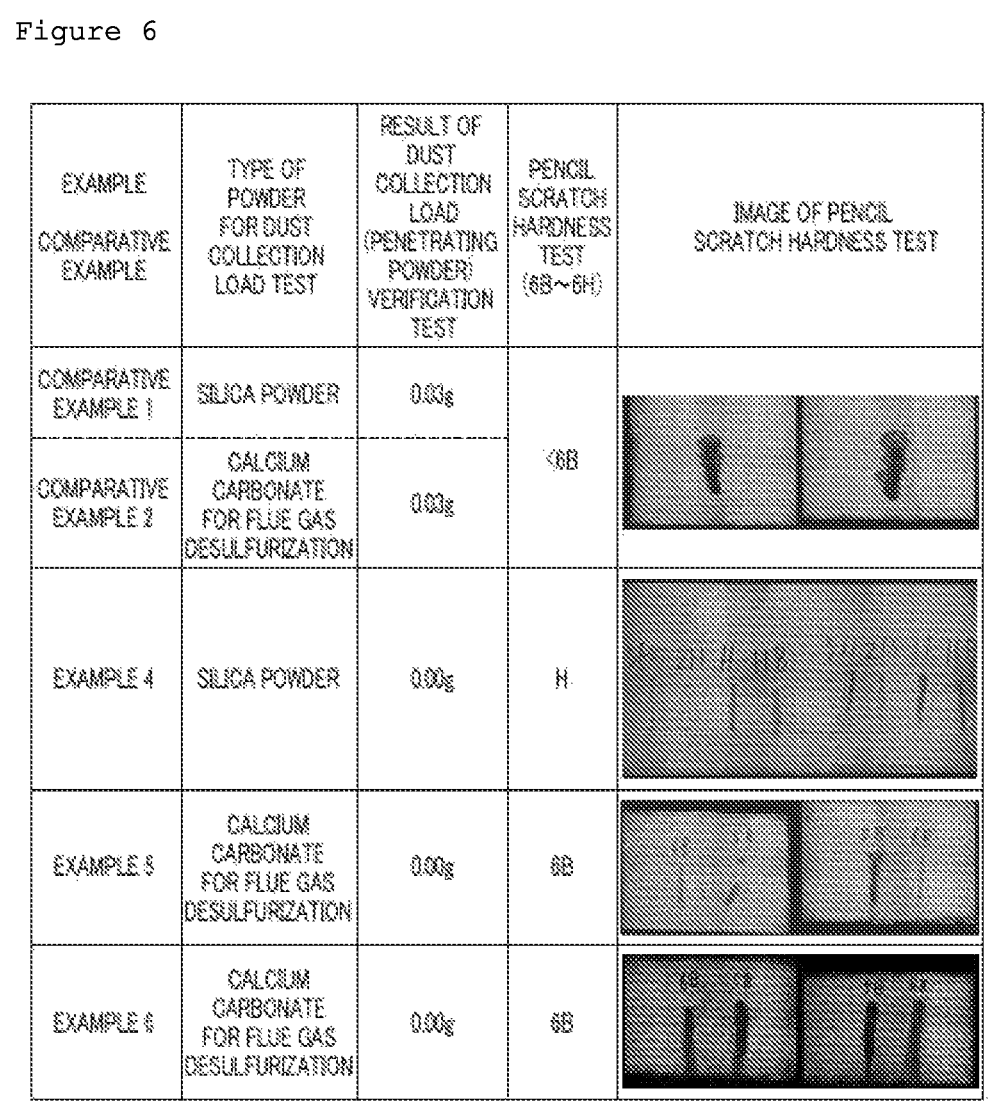

| EXAMPLE COMPARATIVE EXAMPLE | TYPE OF POWDER FOR DUST COLLECTION LOAD TEST | RESULT OF DUST COLLECTION LOAD (PENETRATING POWDER) VERIFICATION TEST | PENCIL SCRATCH HARDNESS TEST (6B~6H) | IMAGE OF PENCIL SCRATCH HARDNESS TEST |
|---|---|---|---|---|
| COMPARATIVE EXAMPLE 1 | SILICA POWDER | 0.03g | <6B | |
| COMPARATIVE EXAMPLE 3 | CALCIUM CARBONATE FOR FLUE GAS DESULFURIZATION | 0.03g | | |
| EXAMPLE 4 | SILICA POWDER | 0.00g | H | |
| EXAMPLE 5 | CALCIUM CARBONATE FOR FLUE GAS DESULFURIZATION | 0.00g | 6B | |
| EXAMPLE 6 | CALCIUM CARBONATE FOR FLUE GAS DESULFURIZATION | 0.00g | 6B | |

COATING SOLUTION

TECHNICAL FIELD

The present invention relates to a coating solution which contains various fine particles as a main component, and is useful as a material for a dust collecting filter and the like.

BACKGROUND ART

Conventionally known filter elements of dust collecting filters are composed of a filter element material having a lamellar structure consisting of a resin sintered body, and a dust collecting layer consisting of resin fine particles. In addition, a conductive carbon layer may be added depending on the specifications of the filter element.

Patent Literatures 1 and 2 describe methods for obtaining a filter element material by sintering a synthetic resin powder, wherein a void allowing the passage of air is formed among the respective synthetic resin particles constituting the sintered body of the synthetic resin obtained by the methods.

The dust collecting layer of the dust collecting filter element is formed by suspending resin fine particles used as the dust collecting layer in an aqueous solvent to prepare a coating solution containing the resin fine particles used as the dust collecting layer, and applying the coating solution on the surface of a filter element material consisting of a resin sintered body and then drying the coating solution to form the dust collecting layer.

An antistatic filter element is produced by suspending a conductive carbon powder in an aqueous solvent to prepare a coating solution containing the conductive carbon powder, applying the carbon coating solution on the surface of a filter element material consisting of a resin sintered body and then drying the coating solution to form a conductive carbon layer, and then applying then drying a coating solution containing resin fine particles used as a dust collecting layer to form a dust collecting layer.

For the fine particles of a resin used as the dust collecting layer of the filter element, the material and particle size of the resin are selected according to the properties and particle size of the dust to be collected using the dust collecting filter.

Usually, the material of the resin used as the dust collecting layer is selected from PE, PTFE, and the like, and the particle size of the resin is selected from the range of 1 to 100 μm.

The dust collecting layer is formed by individually laminating the fine particles of a resin used for the collecting layer, which forms a structure having voids allowing the passage of air among the respective resin fine particles constituting the collecting layer.

The dust of the dust-containing air containing the particles to be collected is trapped by the dust collecting layer.

The clean air obtained after collecting the dust by the dust collecting layer passes through the voids formed in the collecting layer and allowing the passage of air, then flows into a filter element by further passing through the voids of the filter element material.

The filter element of the dust collecting filter thus produced has been widely adopted as means for environmental dust collection at dust generating sites in domestic and overseas mines, quarrying plants, steel plants, and the like, as a dust collecting filter element that can be used continuously for a long period of time.

However, in recent years, it has also been adopted in applications collecting fine powder products such as printing applications by electrophotographic printing systems.

In the past years, the image quality of drawings has improved in electrophotographic printing systems, and there is a demand for full-color image quality or high definition close to silver halide photography in the field of high-grade printing.

As a consequence, the particle size of the fine powders (toners) used for printing has tended to decrease over the years, and while the average particle size of the toners produced by conventional kneading and grinding around 1990 was 8 to 12 μm, average particle sizes of 5 to 9 μm are now mainstream due to a shift in the manufacturing method to a chemical manufacturing process after 2000 (see Non Patent Literature 1).

Given these circumstances, there is a strong demand for a dust collecting filter element capable of collecting fine powder products having a small particle size from manufacturers of electrophotographic printing system equipment which manufactures the fine particles.

RELATED ART

Patent Literature

Patent Literature 1: Japanese Patent Laid-Open No. 2003-126627

Patent Literature 2: Japanese Patent Laid-Open No. 2004-202326

Non Patent Literature

Non Patent Literature 1: Technical Report No. 20 (2011) "EA-Eco Toner" published by Fuji Xerox Co., Ltd.

SUMMARY OF INVENTION

Problem to be Solved by the Invention

In response to the above demand, through making trials and errors on the method for selecting the resin fine particles to be used for the dust collecting layer formed on the surface of a filter element material consisting of a resin sintered body; and preparing the coating solution used when applying the resin fine particles;

a method for manufacturing an element capable of collecting fine particles by forming a uniform layer of resin fine particles on the surface of the filter element material has been developed.

However, the dust collecting layer consisting of resin fine particles formed on the surface of a filter element material consisting of a resin sintered body by conventional methods and formulations has an essential problem that the dust collecting layer easily peels off from the filter element material by contact with a sharp material to the dust collecting layer.

Another problem also occurred; when the particles used for the collecting layer were made finer to collect fine dust, the dispersibility in the coating solution was impaired, making it difficult to coat uniformly.

Solution to Problem

As a result of intensive research to solve the above problems, the present inventors have found that the above problems can be solved by using a solution containing dopamine hydrochloride as a dispersant for fine particles to strengthen the bonding between the dust collecting layer and the filter element material, and furthermore, by using particles having better dispersibility than resin fine particles such as silica powder to ensure dispersibility even with fine particles.

Polydopamine (PDA), a polymer of dopamine, is an adhesive protein secreted from the byssus glands of mytilidae such as the common mussels, and is known to be an adhesive substance strong enough to prevent the shells from being washed away by rough waves even on wet rocks.

Furthermore, the present inventors have also found that, when preparing the coating solution, it is possible to control the degree of polymerization of dopamine in the prepared coating solution and obtain a better dust collecting layer by preparing the coating solution by adding dopamine hydrochloride after pouring and stirring spherical silica or the like in the buffer solution first, rather than a coating solution in which dopamine hydrochloride is added to the buffer solution, then spherical silica or the like is poured and the mixture is shaken.

That is, when adding dopamine hydrochloride to a buffer solution to prepare a DOPA solution and then pouring spherical silica or the like in the solution, the dopamine hydrochloride is consumed by self-polymerizing in the DOPA solution prepared in advance, which causes variation in the components of the coating solution, whereas when the coating solution is prepared according to the present method, dopamine hydrochloride is not consumed by self-polymerization, which causes less variation in the components of the coating solution, and allows to obtain a good dust collecting layer.

The present invention has been achieved based on such findings, and is as follows:

(1) A coating solution for forming a dust collecting layer in a dust collecting filter, which contains a powder consisting of organic fine particles or inorganic fine particles, dopamine hydrochloride, and an adhesive.

(2) The coating solution for forming a dust collecting layer in a dust collecting filter according to (1), wherein the powder is spherical silica.

(3) The coating solution for forming a dust collecting layer in a dust collecting filter according to (1) or (2), wherein an average particle size (D50 value) of the powder is 0.1 to 30 μm.

(4) A method for producing a coating solution for forming a dust collecting layer in a dust collecting filter, including pouring inorganic fine particles and an adhesive in a buffer solution, stirring the mixture to homogenize it, and then adding dopamine hydrochloride.

As the fine powder used as the dust collecting layer according to the technique of the present invention, either organic fine particles or inorganic fine particles can be used. The particle size can be selected within the range of 0.1 to 100 μm, and the average particle size is preferably 0.1 to 30 μm.

The average particle size described here refers to the D50 value obtained when measuring with a particle size distribution analyzer exemplified by Microtrac and HELOS & RODOS.

In addition, when a dispersant is added to the fine particles and the mixture is used as a coating solution, a surfactant can be added to facilitate coating.

Examples of the case where silica fine particles having excellent dispersibility are used as the fine particles contained in the coating solution are described below.

The addition rate of the silica fine particles can be selected from a proportion of 1 wt % to 50 wt % in all the components of the coating solution. More preferably, spherical silica is added at a proportion in the range of 25 wt % to 35 wt %, and the surfactant is added at a proportion in the range of 0.1 wt % to 10.0 wt %.

When the amount of spherical silica contained in the coating solution is less than 1 wt %, the spherical silica does not spread over the whole dust collecting layer formed by the coating, and does not sufficiently fill the pores of the filter element material, and when it exceeds 50 wt %, the spherical silica forms a lump, and is difficult to apply uniformly when applied to the surface of the filter element material.

Within the above range, the viscosity of the solution increases rapidly when adding spherical silica, but the mixture becomes temporarily liquid by vigorous stirring, and looks like a semi-solid when placed on the element for coating. However, it becomes like a liquid when spread with a brush or the like, and can be easily applied. This also applies to spray coating with a spray.

When the coating solution contains a surfactant, its proportion occupying in all the components of the coating solution should be 10 wt % or less. If the amount of surfactant exceeds 10 wt %, the coating solution will be repelled by the surface of the filter element material, making coating difficult.

Advantageous Effects of Invention

In the dopamine hydrochloride contained in the coating solution of the present invention, dopamine self-polymerizes under weak alkaline conditions to form polydopamine, which coats the surface of the fine particles, and the adhesion between the fine particles in the dust collecting layer formed on the surface of the element material by the application of the coating solution is exhibited by the interaction with the water-soluble adhesive blended in the coating solution.

In addition, the interactions between the coating film and the element material can be enhanced, and the bonding between the dust collecting layer formed by the application of the coating solution and the element material can be strengthened, allowing to produce a filtration element having excellent strength.

Furthermore, the coating solution containing the dispersant of the present invention is also excellent in strength after solidification, and therefore a free-standing thin film having microvoids can be obtained when thinned.

In addition, by using the coating solution of the present invention, it is possible to form a uniform dust collecting layer even when silica fine particles having an average particle diameter of 4 μm or less are used.

This collecting layer has superior collection performance, strength and adhesive strength, resists water, and can be applied even when the pore size of the resin sintered body constituting the filter element material is large or when the element material to be coated is bent.

Moreover, the size of the pores in the dust collecting layer can be adjusted by adjusting the content and the particle size of the silica fine particles used in the coating solution prepared by the above method.

In addition, the fine particles contained in the coating solution are not limited to silica fine particles, and organic fine particles exemplified by polytetrafluoroethylene (PTFE) and polyethylene (PE) can also be used.

BRIEF DESCRIPTION OF DRAWINGS

FIG. 1 is photographs of the dust collecting layers formed on the surface of the filter element prepared in Example 1 on which incisions were made with a multi-tooth cutter for cross-cut test.

FIG. 5 is photographs of the coated surfaces of samples coated with a coating solution prepared using various fine particles.

FIG. 6 is the results (images) of ① a pencil scratch hardness test and the results of a dust load (penetrating powder) verification test on the dust collecting layers formed using the coating solutions prepared in Examples 4 and 5 and Comparative Examples.

DESCRIPTION OF EMBODIMENTS

The following is a specific description based on the Examples of the present invention. However, the present invention is not limited to the following Examples.

Example 1

Table 1 shows typical liquid compositions for preparing a coating solution used for forming a dust collecting layer according to the present invention. Here, the "DOPA solution" is an aqueous solution consisting of 0.2 wt % of dopamine hydrochloride, 0.15 wt % of Tris Base, and the rest of water.

The adhesive strength of the dust collecting layers thus formed on the surface of the filter element was measured in the following manner with reference to JIS K 5600-5-6.

<Cross-Cut Test Method>

(1) The dust collecting layers formed on the surface of the filter element by the method of Example 1, in which six 90° cross incisions were made using a multi-tooth cutter for cross-cut test (3 mm interval, manufactured by Allgood) were photographed. The photographs taken are shown in [FIG. 1].

(2) Cellophane tape (commercial product) was pulled out at a constant speed and cut into small pieces having a length of about 75 mm.

(3) The center of the cellophane tape was placed in a direction parallel to the cut grid, laid flat with the fingers at a length exceeding 20 mm before and after the cut grid, and tightly pressed on the dust collecting layer formed on the surface of the filter element.

(4) The cellophane tape tightly pressed above is peeled off from the dust collecting layer formed on the surface of the filter element within 5 minutes. Here, the tape was held at an angle as close as possible to 60° to the surface of the filter element, and was firmly peeled off in 0.5 to 1.0 seconds.

(5) The cut grids after peeling were arranged side by side and photographed. The photographs taken are shown in [FIG. 2].

(6) The tapes were stored by attaching them on a clear file folder.

Figure 2:
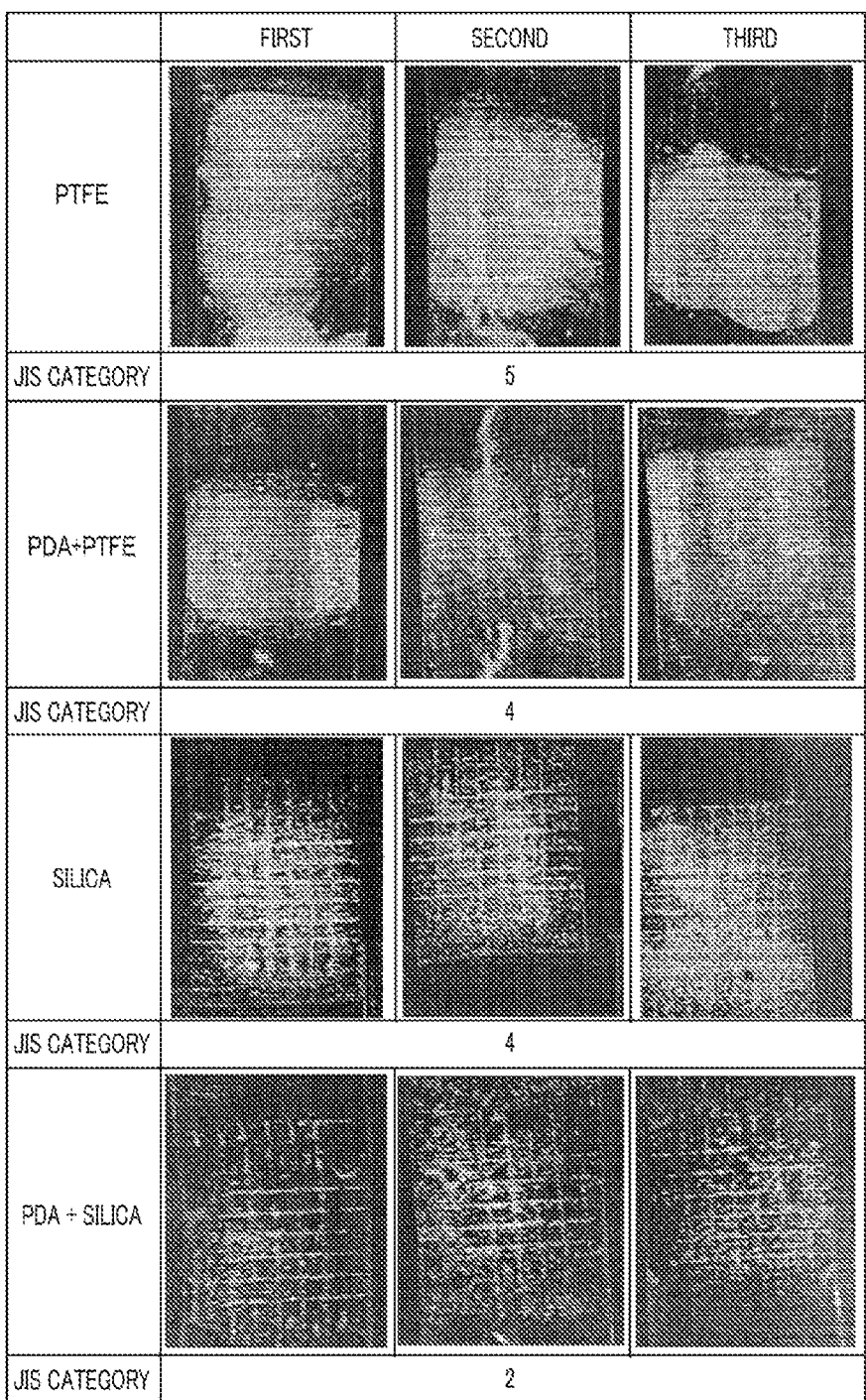
FIG. 2 is photographs of the tapes after the peeling test on the dust collecting layers formed on the surface of the filter element on which incisions were made with the cutter of FIG. 1.

The results of the test conducted as described above were evaluated according to the evaluation criteria shown in Table 2 below. The photographs of the coated surfaces before and after the peeling test with the tape are shown in FIG. 1, and the photographs of the surface of the tapes used in the peeling test are shown in FIG. 2.

TABLE 1

| Coating Solution | Water (wt %) | DOPA Solution (wt %) | Surfactant (wt %) | PTFE Powder (wt %) | Spherical Silica Powder (wt %) | Adhesive (wt %) | Anti foamer (wt %) |
|---|---|---|---|---|---|---|---|
| Example 1 | PTFE | 75.7 | 0.0 | 0.0 | 20 | 0 | 4 | 0.3 |
| Example 2 | DOPA + PTFE | 0.0 | 75.7 | 0.0 | 20 | 0 | 4 | 0.3 |
| Example 3 | Silica | 59.8 | 0.0 | 0.2 | 0 | 30 | 10 | 0.0 |
| Example 4 | DOPA + Silica | 0.0 | 63.8 | 0.2 | 0 | 26 | 10 | 0.0 |

Spherical silica and PTFE fine particles having an average particle size of 4 μm or less were used as the fine particles to be used as the dust collecting layer.

A coating solution in which a DOPA solution was added as a dispersant, and for comparison, a coating solution in which no DOPA solution was added were prepared.

Each was applied to a filter element material having a lamellar structure consisting of a resin sintered body, which was then dried to form a dust collecting layer on the surface of the filter element.

TABLE 2

| Category | Description | Surface condition of the cross-cut area where peeling has occurred (example of 6 types of parallel cuts) |
|---|---|---|
| 0 | The edges of the cuts are perfectly smooth and there is no peeling on any of the grids. | — |

TABLE 2-continued

| Category | Description | Surface condition of the cross-cut area where peeling has occurred (example of 6 types of parallel cuts) |
| --- | --- | --- |
| 1 | Slight peeling of the coating film at the intersections of the cuts. The affected cross-cut area is clearly not more than 5%. | |
| 2 | The coating film is peeling off along the edges of the cuts and/or at the intersections. The affected cross-cut area is clearly more than 5% but not more than 15%. | |
| 3 | The coating film has large peeling partially or on the entire surface along the edges of the cuts, and/or various portions of the squares peel off partially or on the entire surface. The affected cross-cut area is clearly more than 15% but not more than 35%. | |
| 4 | The coating film has large peeling partially or on the entire surface along the edges of the cuts, and/or several squares peel off partially or on the entire surface. The affected cross-cut area is clearly more than 35%, but not more than 65%. | |
| 5 | The degree of peeling exceeds category 4. | |

As is clear from the results in FIGS. 1 and 2, for the silica fine powder, the adhesive strength in Example 4 in which a DOPA solution was added as a dispersant was significantly improved as compared with Example 3 which contained no DOPA solution.

On the other hand, for the PTFE fine powder, the strength did not improve despite the addition of the DOPA solution (Examples 1 and 2), and was inferior to that of the silica fine particles to which no DOPA solution was added (Example 3).

This may be due to the PTFE fine particles exhibiting water repellency and oil repellency and having poor interaction with the other compounds, or to the PTFE having a solubility parameter lower than the other polymers and a poor compatibility.

Example 2

To 100 g of city water, Tris Base was added at a concentration of 1.5 g/L and dissolved. Next, dopamine hydrochloride was added at a concentration of 2.0 g/L and dissolved to prepare a DOPA solution. 59.8 g of the DOPA solution was collected, to which 10.0 wt % of a water-soluble adhesive and 0.2 wt % of a surfactant were added, mixed, and allowed to stand for 30 minutes.

The DOPA solution after standing was transferred to a plastic bottle, to which 30 g of spherical silica (trade name: Sunsphere H-31, manufactured by AGC Inc.) was added, and the mixture was shaken for 30 seconds. Due to an increase in viscosity, the solution was placed on the filter element material using a spatula, coated 10 times back and forth with a brush, and then dried to form a dust collecting layer, thereby producing a filter element coated with the coating solution of the present invention.

Comparative Example 1

A mixture of 20.0 wt % PTFE particles having an average particle size of 10 μm, 4.0 wt % of a water-soluble adhesive, 0.3 wt % of an antifoamer, and 75.7 wt % of water was prepared.

Hereafter, the filter element of Comparative Example 1 was prepared by using the same method as in Example 2.

<Evaluation of Dust Collection of the Obtained Filter Element>

Figure 3:
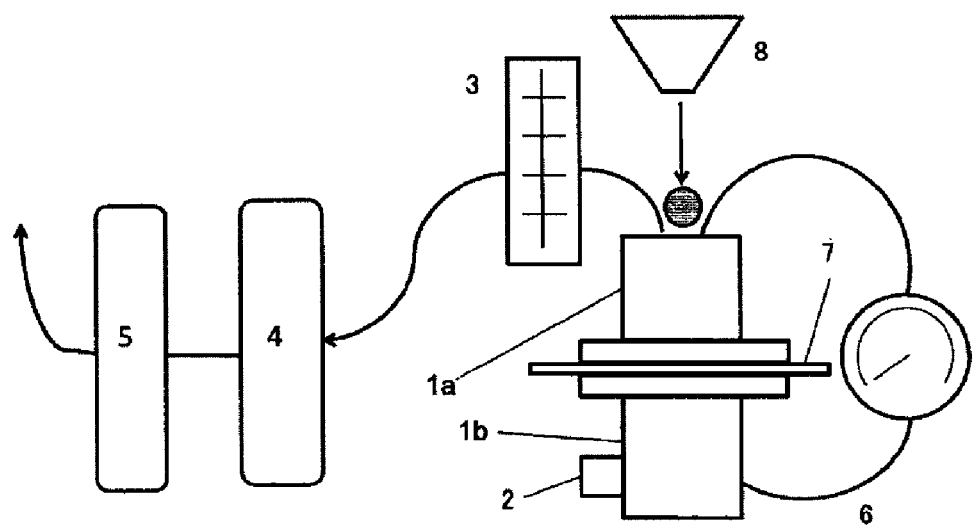
FIG. 3 is a schematic diagram of the dust collector used in the dust collection load verification test of the filter element of Example 2.

The filter element obtained above was attached to the dust collector shown in FIG. 3 to find out the pressure drop and the amount of dust penetrating the dust collecting layer during filtration.

The dust collector consists of two dust collecting cylinders 1a and 1b, and the filter element 7 is attached between the two cylinders 1a and 1b. Since the inside of the cylinder 1a is vacuumed by the vacuum pump 5 to reduce the pressure, the dust-containing gas for the test flows into the other cylinder 1b from the feed port 2.

The suction line connecting the cylinder 1a and the vacuum pump 5 is equipped with a flow meter 3 and a dust concentration meter 4 to measure the dust content remaining in the dust-containing gas for the test from which dust was removed by the filter element 7, and the flow rate of the gas.

Furthermore, a dust shaking off device 8 for measuring the amount of powder that has penetrated the filter element 7 by dust collection for a predetermined amount of time is attached to the cylinder 1a, and the pressure loss of the filter element 7 is measured by a differential pressure gauge 6.

As the experimental dust collecting powder, the spherical silica "Sunsphere H-31" (average particle size: 3.7 μm) manufactured by AGC Inc. was introduced from the feed port 2, and a dust collection load verification test was performed for 5 minutes at a filtered air velocity of 6 m/min (treated air volume: 30 L/min), and a dust feed concentration of 10 g/m³. In the dust collection load verification test, the amount of powder that passed through the filter element into the clean air side as a penetrating powder was evaluated.

After completing the dust collection load verification test, the weight of the filter element was measured after 8.3 g of metallic balls was dropped on it from a fixed position of 80 cm high by the dust shaking off device 8 to shake off the dust collecting powder adhering to the surface of the filter element due to the load test, and the difference from the weight measured beforehand was considered as the penetrating powder. The results of the dust collection load verification test (results of the dust collection load (penetrating powder) verification test) are shown in Table 3.

In the filter element with silica fine particles of Example 2, almost no penetrating powder was observed in a dust collection load verification test of 5 minutes, whereas a significant amount of powder penetrating was observed in the filter element with PTFE particles of Comparative Example 1.

This may be because the surface smoothness was improved as compared with Comparative Example 1, which improved the ability to shake off the dust collecting powder adhering to the surface of the filter element, or decreased the flow path of fine powder connected to the filter element material accordingly.

The above results show that the dust collecting layer according to the present invention is unlikely to become clogged than a conventional one.

[Table 3]

TABLE 3

Dust Collection Load (Penetrating Powder) Verification Test Results of Example 2 and Comparative Example 1

| | Example 2 | Comparative Example 1 |
| --- | --- | --- |
| Amount of powder penetrating in 5 minutes (g) | 0.00 | 0.03 |

Figure 4:
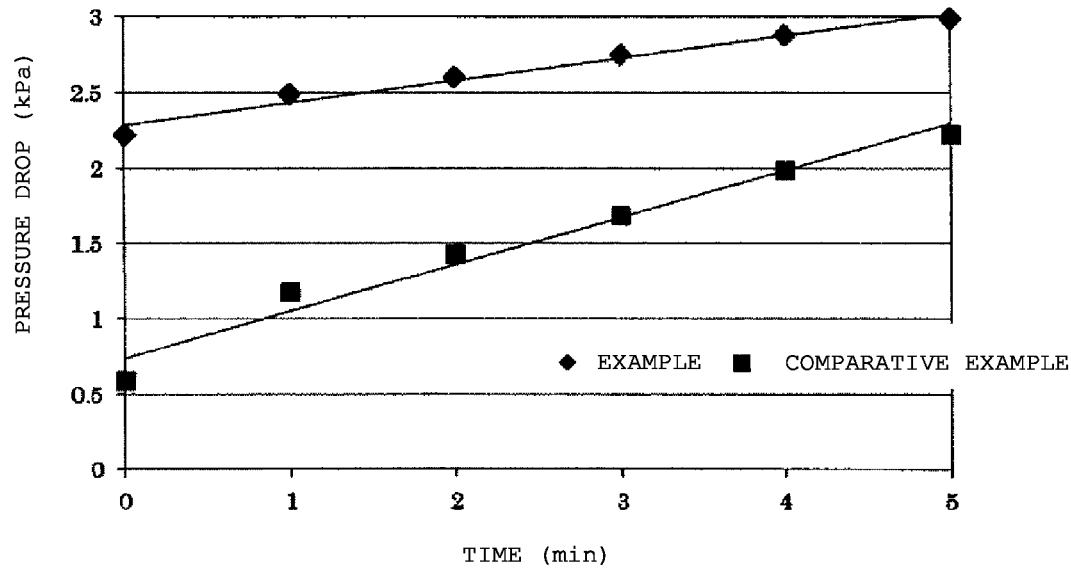
FIG. 4 is a graph showing the results of the hourly measurement of pressure drop carried out using the dust collector of FIG. 3.

The dust collection load verification test was further carried out for 5 hours, and the results of measuring the pressure drop every hour are shown in FIG. 4.

As is clear from this graph, the filter element with silica fine particles of Example 2 has a smaller rate of increase in pressure drop and a longer life-span than the filter element with PTFE particles of Comparative Example 1.

Example 3

The coated surfaces of samples coated with a coating solution prepared using various fine particles were photographed with the camera VHX-6000 (manufactured by KEYENCE CORPORATION) to observe the surface roughness Sa and strength.

Here, the surface roughness Sa (arithmetical mean height) is the average of the absolute values of the differences in height of each point with respect to the average surface of the surface. Specifically, five 200× images were taken, and analyzed from the 3D displayed image, and the average value excluding the maximum and minimum values was adopted.

The strength of the coated surface was evaluated according to the following criteria.

Poor: Peel off when touched with a finger

Fair: Peel off when touched applying pressure with a finger

Good: Does not peel off unless rubbed vigorously and repeatedly with a finger

Very good: Difficult to peel off by the pressure of a finger

The composition of the coating solution of each sample is shown in Table 4.

TABLE 4

| | Coating Powder | | Water | DOPA Solution | Surfactant | Adhesive | Anti foamer |
|---|---|---|---|---|---|---|---|
| | Type | (wt %) | (wt %) | (wt %) | (wt %) | (wt %) | (wt %) |
| Example 5 | PTFE | 20 | 75.7 | 0.0 | 0.0 | 4 | 0.3 |
| Example 6 | Spherical Silica | 26 | 0.0 | 63.8 | 0.2 | 10 | 0.0 |
| Example 7 | Spherical Silica | 30 | 59.8 | 0.0 | 0.2 | 10 | 0.0 |
| Example 8 | Alumina | 40 | 0.0 | 49.8 | 0.2 | 10 | 0.0 |
| Example 9 | Hematite | 40 | 0.0 | 49.8 | 0.2 | 10 | 0.0 |

FIG. 5 shows the surface photograph for each sample, and Table 5 shows the measurement results for each sample.

TABLE 5

| | PDA | Coating Powder | Surface roughness [µm] | Strength | Condition |
|---|---|---|---|---|---|
| Example 5 | No | PTFE | 8.05 | Poor | Surface has some roughness, porous, but brittle and easily peels off |
| Example 6 | Yes | Spherical Silica | 3.77 | Very good | Surface is smooth, very strong and very hard to peel off, while being porous |
| Example 7 | No | Spherical Silica | 6.47 | Good | Surface is smooth, strong and hard to peel off, while being porous |

TABLE 5-continued

| | PDA | Coating Powder | Surface roughness [µm] | Strength | Condition |
|---|---|---|---|---|---|
| Example 8 | Yes | Alumina | 10.08 | Good | Particles inside the voids of the base material, and most of the irregularities arising from the base material resin remained on the surface |
| Example 9 | Yes | Hematite | 5.59 | Good | Surface has roughness, strong and hard to peel off, while being porous |

As is clear from the results in Table 5, the surface was smoother and the strength was improved in the Examples in which spherical silica was used as the fine particles (coating powder) contained in the coating solution, as compared with the Conventional Example (Example 5).

In particular, the strength was significantly improved in Example 6 in which a DOPA solution was added and an adhesive was used.

In the Example in which alumina was used as the coating powder, the strength was improved as compared with the Conventional Example (Example 5). However, the particles could easily enter the voids in the element material, and irregularities arising from the element material resin tended to remain on the surface of the dust collecting layer.

Furthermore, when hematite was used as another inorganic powder, the strength was also increased as compared with the Conventional Example (Example 5), and it was found that adding a DOPA solution allowed to use various inorganic powder particles and organic fine particles to form a dust collecting layer with excellent strength.

Example 4

Coating Example 1 of Coating Solution Prepared by Adding Dopamine Hydrochloride after Dispersing Spherical Silica A uniform slurry of dispersed spherical silica "Sunsphere H-31" (average particle size: 3.7 µm) was obtained, and dopamine hydrochloride was added to this slurry to prepare a coating solution according to the blending amount shown in Table 6.

TABLE 6

| Coating Solution | Water (wt %) | Tris Base (wt %) | Spherical Silica Powder (wt %) | Surfactant (wt %) | Adhesive (wt %) | Dopamine Hydrochloride (wt %) |
|---|---|---|---|---|---|---|
| Example 10 | 59.09 | 0.09 | 30 | 0.2 | 10.5 | 0.12 |
| Example 11 | 59.29 | 0.09 | 30 | 0.0 | 10.5 | 0.12 |

A filter element coated with the coating solution of the present invention was prepared by placing the coating solution prepared above on the filter element material, coating it using a rubber spatula having a shape corresponding to the lamellar structure irregularities of the filter element material, and then drying it to form a dust collecting layer.

<Evaluation of Dust Collection of the Filter Element Obtained in Example 4>

The filter element obtained above was attached to the dust collector shown in FIG. 3, and the amount of dust penetrating the dust collecting layer during filtration was examined.

As the experimental dust collecting powder, the spherical silica "Sunsphere H-31" (average particle size: 3.7 μm) manufactured by AGC Inc. was introduced from the feed port 2, and a dust collection load verification test was performed for 5 minutes at a filtered air velocity of 6 m/min (treated air volume: 30 L/min), and a dust feed concentration of 10 g/m$^3$. In the dust collection load verification test, the amount of powder that passed through the filter element into the clean air side as a penetrating powder was evaluated.

The results of the dust collection load verification test (results of the dust collection load (penetrating powder) verification test) are shown in Table 7.

In the filter element with silica fine particles of Example 4, almost no penetrating powder was observed in a dust collection load verification test of 5 minutes, whereas a significant amount of penetrating powder was observed in the filter element with PTFE particles of Comparative Example 1.

This may be because the surface smoothness was improved as compared with Comparative Example 1, which improved the ability to shake off the dust collecting powder adhering to the surface of the filter element, and decreased the flow path of fine powder connected to the filter element material accordingly.

The above results show that the dust collecting layer according to the present invention is unlikely to become clogged than a conventional one.

TABLE 7

| | Dust Collection Load (Penetrating Powder) Verification Test Result of Example 4 | |
|---|---|---|
| | Result of the Present Example | Result of Comparative Example 1 |
| Amount of powder penetrating in 5 minutes (g) | 0.00 | 0.03 |

Example 5

Coating Example 2 of Coating Solution Prepared by Adding Dopamine Hydrochloride after Dispersing Spherical Silica A uniform slurry of dispersed spherical silica "Sunsphere H-31" (average particle size: 3.7 μm) was obtained, and dopamine hydrochloride was added to this slurry to prepare a coating solution according to the blending amount shown in Table 8.

TABLE 8

| Coating Solution | Water (wt %) | Spherical Silica Powder (wt %) | Surfactant (wt %) | Adhesive (wt %) | Dopamine Hydrochloride (wt %) |
|---|---|---|---|---|---|
| Example 12 | 52.69 | 32.0 | 0.2 | 15.0 | 0.11 |
| Example 13 | 52.89 | 32.0 | 0.0 | 15.0 | 0.11 |

A filter element coated with the coating solution of the present invention was prepared by placing the coating solution prepared above on the filter element material, coating it using a rubber spatula having a shape corresponding to the lamellar structure irregularities of the filter element material, and then drying it to form a dust collecting layer.

<Evaluation of Dust Collection of the Filter Element Obtained in Example 5>

The filter element obtained above was attached to the dust collector shown in FIG. 3, and the amount of dust penetrating the dust collecting layer during filtration was examined.

As the experimental dust collecting powder, "Calcium carbonate for flue gas desulfurization" (average particle size: 12.0 μm) manufactured by Nittetsu Mining Co., Ltd., Ikura Mining Plant was introduced from the feed port 2, and a dust collection load verification test was performed for 5 minutes at a filtered air velocity of 6 m/min (treated air volume: 30 L/min), and a dust feed concentration of 10 g/m$^3$. In the dust collection load verification test, the amount of powder that passed through the filter element into the clean air side as a penetrating powder was evaluated.

The results of the dust collection load verification test (results of the dust collection load (penetrating powder) verification test) are shown in Table 9. In the filter element with silica fine particles of Example 5, almost no penetrating powder was observed in the dust collection load verification test of 5 minutes.

This may be because the surface smoothness was improved as compared with the Comparative Examples, which improved the ability to shake off the dust collecting powder adhering to the surface of the filter element, and significantly decreased the pores into which the dust to be collected penetrates accordingly.

The above results show that the dust collecting layer according to the present invention is unlikely to become clogged than a conventional one.

TABLE 9

| Dust Collection Load (Penetrating Powder) Verification Test Result of Example 5 | |
| --- | --- |
| | Result of the Present Example |
| Amount of powder penetrating in 5 minutes (g) | 0.00 |

Example 6

Coating Example of Coating Solution Prepared by Adding Dopamine Hydrochloride after Dispersing Spherical Silica with Different Average Particle Sizes According to the blending amounts shown in Table 10, a uniform slurry was obtained, in which Tris Base was added and dissolved in city water, and an adhesive and two pre-mixed spherical silica having different particle sizes "Sunsphere H-31" (average particle size: 3.7 μm) and "Sunsphere H-201" (average particle size: 23.1 μm) were dispersed, and dopamine hydrochloride was added to this slurry to prepare a coating solution. This coating solution exhibited thixotropic properties.

The average particle size after mixing the two types of spherical silica was 23.07 μm. The average particle size was measured using the laser diffraction particle size analyzer "HELOS (BR-multi) & RODOS".

TABLE 10

| Coating Solution | Water (wt %) | Tris Base (wt %) | Adhesive (wt %) | Spherical Silica Powder (wt %) | | Dopamine Hydrochloride (wt %) |
| --- | --- | --- | --- | --- | --- | --- |
| | | | | H-31 | H-201 | |
| Example 14 | 59.30 | 0.08 | 10.50 | 4.10 | 25.90 | 0.12 |

A filter element coated with the coating solution of the present invention was prepared by placing the coating solution prepared above on the filter element material after sufficiently stirring to reduce the viscosity, coating it using a rubber spatula having a shape corresponding to the lamellar structure irregularities of the filter element material, and then drying it to form a dust collecting layer.
<Evaluation of Dust Collection of the Filter Element Obtained in Example 6>
The filter element obtained above was attached to the dust collector shown in FIG. 3, and the amount of dust penetrating the dust collecting layer during filtration was examined.
As the experimental dust collecting powder, "Calcium carbonate for flue gas desulfurization" (average particle size: 12.0 μm) manufactured by Nittetsu Mining Co., Ltd., Ikura Mining Plant was introduced from the feed port 2, and a dust collection load verification test was performed for 5 minutes at a filtered air velocity of 6 m/min (treated air volume: 30 L/min), and a dust feed concentration of 10 g/m³. In the dust collection load verification test, the amount of powder that passed through the filter element into the clean air side as a penetrating powder was evaluated.

Comparative Example 2

Evaluation of Dust Collection of the Obtained Filter Element

A filter element produced by using a coating solution prepared with the same formulation as in Comparative Example 1 was attached to the dust collector shown in FIG. 3, and the amount of dust penetrating the dust collecting layer during filtration was examined.
As the experimental dust collecting powder, "Calcium carbonate for flue gas desulfurization" (average particle size: 12.0 μm) manufactured by Nittetsu Mining Co., Ltd., Ikura Mining Plant was introduced from the feed port 2, and a dust collection load verification test was performed for 5 minutes at a filtered air velocity of 6 m/min (treated air volume: 30 L/min), and a dust feed concentration of 10 g/m³. In the dust collection load verification test, the amount of powder that passed through the filter element into the clean air side as a penetrating powder was evaluated.
The results of the dust collection load verification test (results of the dust collection load (penetrating powder) verification test) are shown in Table 11. In the filter element with silica fine particles of Example 6, almost no penetrating powder was observed in the dust collection load verification test of 5 minutes.
This may be because the surface smoothness was improved as compared with Comparative Example 2, which improved the ability to shake off the dust collecting powder adhering to the surface of the filter element, and significantly decreased the pores into which the dust to be collected penetrates accordingly.
The above results show that the dust collecting layer according to the present invention is unlikely to become clogged than a conventional one.

TABLE 11

| Dust Collection Load (Penetrating Powder) Verification Test Results of Example 6 and Comparative Example 2 | | |
| --- | --- | --- |
| | Result of the Present Example | Comparative Example 2 |
| Amount of powder penetrating in 5 minutes (g) | 0.00 | 0.03 |

<Evaluation of the Strength of the Obtained Filter Element Dust Collecting Layer>
The strength of the dust collecting layers formed on the surface of the filter element according to the procedures shown in Examples 4, 5 and 6 was measured in the following manner with reference to JIS K 5600-5-4 (pencil scratch hardness test). The results of the evaluation of the strength of the dust collecting layers are shown in FIG. 6. In addition, the results of the dust collection load (penetrating powder) verification test are also shown in FIG. 6.
As is clear from FIG. 6, the strength of the dust collecting layer formed in Example 4 is greater than that of the dust collecting layer formed in the Comparative Examples, and almost no penetrating powder was observed. In addition, the dust collecting layers formed in Examples 5 and 6 had a strength of only 6B, but almost no penetrating powder was observed.
<Definition of Pencil Scratch Hardness Test>
Pencil hardness: the resistance of a coating film to scratches or other defects caused by the movement of a pencil lead of a specified size, shape and hardness pressed against the coating film surface. There are several types of defects of the coating film surface caused by a pencil lead. These defects are defined as follows.
   a) Plastic deformation: permanent dents are formed in the coating film, but there is no cohesive fracture.

b) Cohesive fracture: scratches or fractures on the surface where the coating material has come off are visible to the naked eye.

c) Combination of above: in the last stage, all defects may occur at the same time.

<Method for Pencil Scratch Hardness Test>

(1) The test is performed at a temperature of 23±2° C. and a relative humidity of (50±5)%.

(2) Using a pencil sharpener, the wood part of the pencil is carefully removed to obtain a pencil lead that is a smooth cylinder without scratches, and the lead is exposed by 5 to 6 mm.

(3) The pencil must be kept vertical and the lead must be placed on the sandpaper and moved back and forth while maintaining an angle of 90° to flatten the tip of the lead. This is continued until a smooth, circular cross section is obtained with no debris or cracks at the corners of the lead. This operation is repeated each time the pencil is used.

(4) The coated plate is placed on a flat and solid horizontal surface. The pencil is attached to a stopper which is tightened to the position at which the test device is horizontal when the tip of the pencil touches the coating film.

(5) After the tip of the pencil gets on the coating film, the device is immediately pushed for a distance of at least 7 mm away from the operator at a speed of 0.5 to 1 mm/s.

(6) The coated surface is inspected with the naked eye, and the type of indentation (mark) defined above is examined with the naked eye. The evaluation of fractures is easier when the powder of the pencil lead on the coated surface is wiped off using a soft cloth or absorbent cotton and an inert solvent.

When performing this operation, one has to be careful not to affect the hardness of the tested site.

When no scratches are formed, the hardness scale is increased and the tests (3) to (6) are repeated until the test site has scratches having a length of at least 3 mm or more without overlapping.

When a scratch is formed, the hardness scale is decreased and the tests (3) to (6) are repeated until no scratches are formed.

The type of defect defined above is determined. The hardness of the hardest pencil that did not cause scratches is referred to as pencil hardness.

(7) The test is performed twice, and if the results of the two tests differ by one unit or more, they are discarded and the test is done again.

INDUSTRIAL APPLICABILITY

The molded body obtained by drying and solidifying the coating solution according to the technique of the present invention has superior collection performance, strength and adhesive strength, resists water, and is not easily cracked even when bent to some extent.

Therefore, a resin sintered body-like molded body of the filter element can be produced and used as an element for an existing filter such as a Sinter-Lamellar-Filter (registered trademark).

Therefore, it is possible to obtain an element in which the frequency of occurrence of "passage", in which the particles to be collected pass through the voids among the fine particles constituting the dust collecting layer into the clean air side, and of "clogging", in which fine particles penetrate the voids among the fine particles constituting the dust collecting layer, are significantly reduced when the coating solution according to the technique of the present invention is applied to a filter element material having a lamellar structure consisting of a resin sintered body to form a dust collecting layer on the surface of the filter element, and when the coating solution is dried and solidified and used as an element of a dust collecting filter as a molded body, but also when a fine powder in which the particles to be collected have an average particle size of 10 μm or less is collected for a long time.

This can be expected to contribute to a greater efficiency of the maintenance of a dust collector for dust collector users and an improved productivity.

REFERENCE SIGNS LIST 1a, 1b Dust collecting cylinder
2 Feed port
3 Flow meter
4 Dust concentration meter
5 Vacuum pump
6 Differential pressure gauge
7 Filter element
8 Dust shaking off device

The invention claimed is:

1. A coating solution for forming a dust collecting layer in a dust collecting filter, comprising:

(i) a powder consisting of organic fine particles or inorganic fine particles, (ii) dopamine hydrochloride, and (iii) a water-soluble adhesive, wherein the powder is any one of selected from the group consisting of silica, alumina and hematite, wherein an average particle size D50 of the powder is 3.7 μm to 30.0 μm, and wherein the coating solution is produced by the following in this order:

(1) pouring a powder consisting of organic fine particles or inorganic fine particles and a water-soluble adhesive in a buffer solution, (2) stirring the mixture to homogeneity, and then (3) adding dopamine hydrochloride.

2. The coating solution for forming a dust collecting layer in a dust collecting filter according to claim 1, wherein the powder is spherical silica.

3. A method for producing a coating solution for forming a dust collecting layer in a dust collecting filter, comprising the following in this order:

(1) pouring a powder consisting of organic fine particles or inorganic fine particles and a water-soluble adhesive in a buffer solution, (2) stirring to homogeneity the mixture, and then (3) adding dopamine hydrochloride, wherein the powder is any one of selected from the group consisting of silica, alumina and hematite, and wherein an average particle size D50 of the powder is 3.7 μm to 30.0 μm.

4. The coating solution of claim 1, wherein the coating solution comprises the dopamine hydrochloride in an amount of 9.96 wt % to 15.14 wt % and the water-soluble adhesive in an amount of 4 wt % to 10 wt %.

* * * * *